United States Patent [19]
Salisbury, Jr. et al.

[11] Patent Number: 4,903,536
[45] Date of Patent: Feb. 27, 1990

[54] COMPACT CABLE TRANSMISSION WITH CABLE DIFFERENTIAL

[75] Inventors: J. Kenneth Salisbury, Jr., Cambridge; William T. Townsend, Somerville, both of Mass.; David M. DiPietro, Webster, N.Y.; Brian S. Eberman, Rochester, Minn.

[73] Assignee: Massachusetts Institute of Technology, Cambridge, Mass.

[21] Appl. No.: 184,273

[22] Filed: Apr. 21, 1988

[51] Int. Cl.[4] .............................................. F16H 27/02
[52] U.S. Cl. .................................... 74/89.22; 414/7; 901/21
[58] Field of Search .................... 414/786, 7; 74/89.22, 74/479; 901/21

[56] References Cited

U.S. PATENT DOCUMENTS

| | | | |
|---|---|---|---|
| 4,784,010 | 11/1988 | Wood et al. | 74/479 |
| 4,806,066 | 2/1989 | Rhodes et al. | 414/729 |

FOREIGN PATENT DOCUMENTS 573800 12/1985 United Kingdom ................ 74/89.22

OTHER PUBLICATIONS

"Kinematic and Force Analysis of Articulated Hands", J. Kenneth Salisbury, Jr. Department of Computer Science, Stanford University, Stanford, Calif. 94305, Report #STAN-C5-82-921, Jul. 1982.
Advertisement, Roto-Lok ® Rotary Drive, Trax Instrument Corporation.
Swift, H. W., "Power Transmission by Belts: An Investigation of Fundamentals," The Institution of Mechanical Engineers, vol. 1, 1928.
Reynolds, O., "On the Efficiency of Belts or Straps as Communicators of Work," The Engineering, vol. 38, 1874, p. 396.
Salisbury, J. K., Jr., "Design and Control of an Articulated Hand," International Symposium on Design and Synthesis, Tokyo, Japan, Jul. 1984.
Bejczy, A. K. and Salisbury, J.K., Jr., "Kinesthetic Coupling Between Operator and Remote Manipulator," Advances in Computer Technology, ASME, vol. 1, Aug. 1980.
Vertut, J. and Coiffet, P., Teleoperations and Robotics: Evolution and Development, "Robot Technology," vol. 3A, Englewood Cliffs, N.J.: Prentice Hall, Inc., 1986, pp. 191-194.
Jacobsen, S. C., Iversen, E. K., Knutti, D. F., Johnson, R. T., and Biggers, K. B., "Design of the Utah/MIT Dexterous Hand," Proc. 1986 IEEE Int'l. Conf. on Robotics and Automation, San Francisco, Calif., Apr. 1986.
Townsend, W. T. and Salisbury, J. K., Jr., "The Effect of Coulomb Friction and Stiction on Force Control," Proc. 1987 IEEE Int'l Conf. on Robotics and Automation, Raleigh, N.C., Apr. 1987.

Primary Examiner—Robert J. Spar
Assistant Examiner—Donald W. Underwood
Attorney, Agent, or Firm—Wolf, Greenfield & Sacks

[57] ABSTRACT

A pretensioned cable transmits power along a first support member (link) from a rotary actuator to a rotating output joint, typically an output pulley fixed to a second link arm but rotatable in a coupling between the first and second links. A reducer, typically two sets of coupled idler pulleys of different diameter, is mounted at a point removed from the actuator, and preferably as close as possible to the output joint. An axially split spool mounted on the actuator output wraps the outgoing and returning cable sections on different halves of the spool in opposite directions to provide pretensioning of the cable in the entire cable circuit at one point. To form a differential, a pretensioned cable carried on paired pulleys having smooth outer surfaces parallel to the axis of rotation couples the pulleys. The pulleys have axes of rotation that can intersect and their cable carrying surfaces are closely spaced, preferably by less than half the width of the cable. The outer surfaces can be stepped to accommodate two or more cables for bi-directional operation, or to create a conventional differential with a spider. The links and pulleys of the transmission are long and narrow. This high aspect ratio provides a compact configuration that is conducive to whole arm manipulations where any exterior surface of the links can engage an object. A low inertia, low friction brushless D.C. motor operating under the control of a pulse width modulated controller responsive to the current drawn by the motor, in combination with the cable transmission of this invention, provide excellent force control.

7 Claims, 5 Drawing Sheets

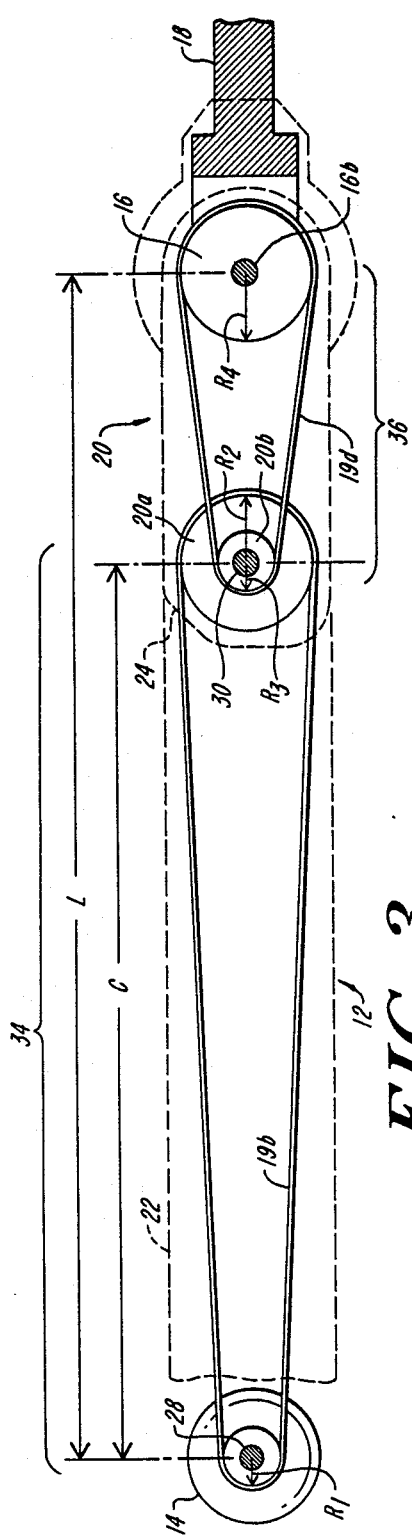
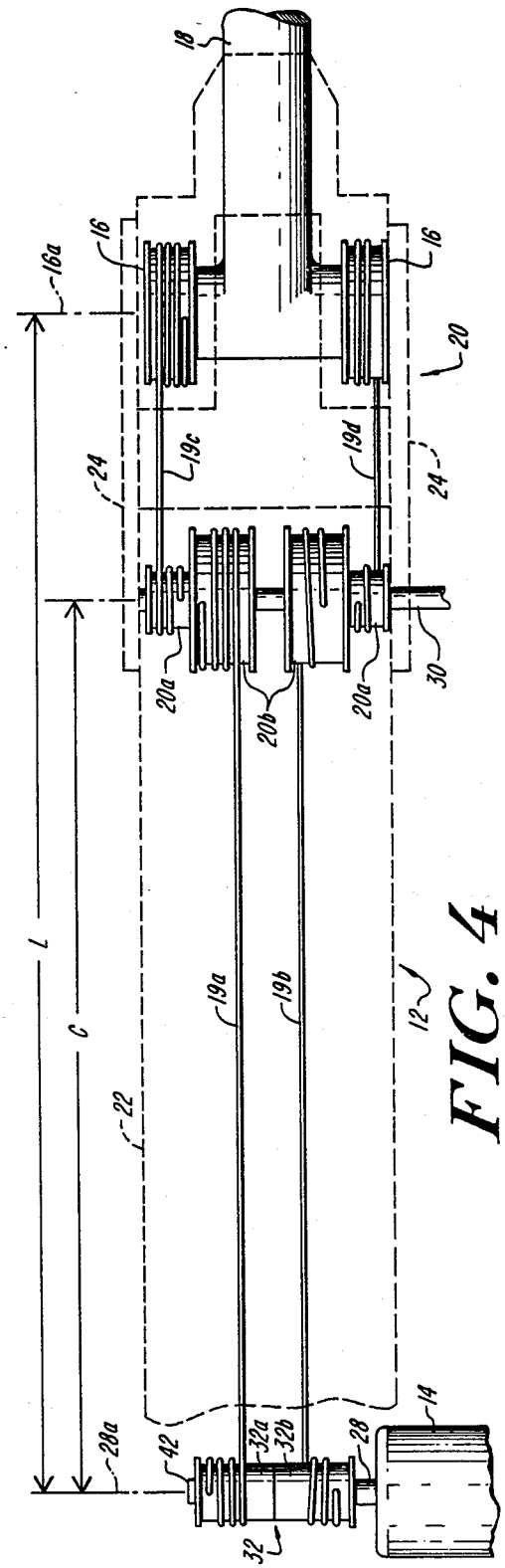
FIG. 3
FIG. 4

COMPACT CABLE TRANSMISSION WITH CABLE DIFFERENTIAL

The U.S. Government has rights in this invention pursuant to Contract Number N00014-86-K-0685 awarded by the Department of the Navy.

BACKGROUND OF THE INVENTION

This invention relates in general to mechanical power transmissions. More specifically, it relates to a low friction cable transmission that is compact, extremely stiff, exhibits low torque ripple and uses cable to mesh flangeless pulleys whose axes of rotation can intersect.

Cables have long been used to transmit power. Conventional block and tackle arrangements used in cranes is one common example. With the Industrial Revolution, the power to weight characteristics of leather belts were found to be advantageous over gear trains in the transmission of power from a single, large-power engine to multiple end-use machines. In modern times, electric generator-motor sets replaced leather belt transmission and belts and cables have been used infrequently. Some examples of modern cable drives include the cabled dentist drill and belt drives for recordplayer turntables, computer printers, and other electro-mechanical equipment.

In the field of teleoperators and robot transmissions, it has been conventional to rely on gears, sometimes combined with cables, to transmit power from a power source, typically an electric motor, to an end use, typically a vise-grip mechanical hand. Gears have been used because they have provided a stiffness not usually associated with cables and because sets of meshing bevel gears were necessary to transmit rotary power where the axes of rotation were not aligned, as at a right angle "shoulder" connection or in a differential transmission used to simulate the twisting motion of the human wrist. Heretofore, while cable or belt differentials have been used, the output pulley has been displaced laterally from the axis of rotation of the input pulley. The need to have the pulleys aligned to avoid belt wear and hold the belt on the pulleys has resulted in the physical interference of the pulleys being a limiting factor on the compactness of the differential.

A robot arm widely used in the automobile industry is the "PUMA 560" manufactured by the Unimation Corporation. It uses gears to transmit power along a set of articulated links to a "hand" mounted at its end remote from the power source. The use of gears results in a heavy transmission which is costly to manufacture and has poor control over the force applied by the arm. The PUMA 560 is also not "backdrivable", that is, if the output becomes the power input, the transmission does not reverse the power transmission with good fidelity. An important reason is that gears suffer from backlash and/or high friction. If they are machined to close tolerances and are well designed, backlash can be controlled and reasonable efficiency levels can be achieved, but the cost of manufacture will become quite high.

Robot arms using cables to transmit power over distances, in a manner analogous to a cable dentist drill, have been manufactured by Microbot. This approach is also used in the MA22 manipulator illustrated and discussed by Vertut and Coiffet in "Teleoperations and Robotics, Evolution and Development", *Robot Technology*, Vol. 3A (Prentice-Hall, Inc. 1986), pp 190–191. Taking the MA22 as an example of this prior art, a fixed shoulder block communicates to an arm through a differential gear drive. An elbow and hand are controlled through cables, but the reduction is accomplished in a counterbalancing block near the motors and far removed from the point of application of the power, at the elbow and hand.

In the same Vertut and Coiffet publication at pp. 191-194, they also describe and show an MA23M manipulator using block and tackles with pretensioned cables to produce a large mechanical advantage. This system is shown in a highly simplified schematic form in FIG. 1 of the present application. While this system recognizes certain advantages of cable transmissions over gear trains, such as high efficiency and the elimination of backlash, it has several significant disadvantages. First, it requires the use of a long, continuous length of high tensioned cable which, over this length, introduces an undesirable compliance due simply to the inherent compliance of the cable itself. This compliance is probably related to a second problem, position dependent changes in the resonant frequency of the transmission that appeared when automatic controls were applied to the transmission. Third, the reduction provided by the block and tackle arrangement is near the motor; a long length of heavy cable couples the block and tackle assemblies to the load. This creates a very high tension in a comparatively long cable and requires that supports sufficient to withstand this level of applied force must span a comparatively long distance. All of these factors introduce the risk of a failure, but also increase the mass and cost of the arm at its remote end.

With respect to pretensioning, it is also important to note that while pretensioning per se is known, the way one goes about it can produce quite different results. Specifically, most pretensioning systems place a resilient element in series with the cable. With the Vertut MA23M manipulator, at least the long length of cable itself acts as a spring in series with the cable. In other applications, such as the Roto-Lok ® cable drive of the Trax company, there is an actual pretensioning spring in series with the cable. Any such series compliance reduces the stiffness of the transmission, and in fact precludes the construction of a highly stiff transmission.

Finally, one of applicants has attempted to produce a cable differential analogous to intermeshed bevel gears, but using two pulleys with smooth bevel surfaces having a groove found in the surface to carry a cable that couples the bevel pulleys. This arrangement did not work since the cable tended to be drawn into the gap between the pulleys and bind. More generally, while cables and belts carried on pulleys are well known to transmit power, heretofore it has been a well known design objective to avoid coupling pulleys that are not aligned so as to avoid the attendant wear and eventual failure of the belt which must constantly rub against the pulley as it is angled out of the plane of rotation of the pulley.

It is therefore a principal object of the present invention to provide a bi-directional cable power transmission which is highly stiff, exhibits low frictional losses and has good fidelity of force transmission.

Another principal object is to provide a transmission between two or more smooth surfaced rotating members that uses a cable as the meshing element and is sufficiently compact that the axes of rotation of the members can intersect.

A further object is to provide a compact three cylinder differential transmission with a cable meshing of the cylinders.

Another object of the invention is to provide a power transmission that is compact, has a good aspect ratio, and which can can be used to drive an arm that can interact with objects at any point along a link.

A further object is to provide a power transmission with the foregoing advantages where an entire cable circuit can be pretensioned from a single point.

A still further object is to provide a power transmission which requires that the highest compressive forces acting on the system be supported over only comparatively short distances.

Yet another object is to provide a cable transmission with all of the foregoing advantages that is readily adaptable to automatic servo-control, and which has a low cost of manufacture as compared to known transmissions.

SUMMARY OF THE INVENTION

A cable transmission transmits torque from a rotary actuator, typically an electric motor, to a rotary output joint which pivots a link arm remote from the actuator. The cable is coupled to the output joint by a reducer that is located at a point distal from the motor and as close to the joint as practicable. The reducer is preferably formed by a set of freely rotatable pulleys, each set having a pair of pulleys of different diameters that rotate in unison. The output joint is typically a pulley, and preferably a set of pulleys of equal diameter that also rotate in unison. The output pulleys are freely rotatable in a coupling member and are operatively connected to the link arm. A frame spans the motor-to-reducer stage of the transmission and mounts the coupling member at its end. The frame can serve as a link of a robot arm.

The cable is preferably separate lengths of cable terminated at the actuator, reducer pulleys and output pulley or pulleys. An axially split spool mounted on the motor shaft wraps the outgoing and incoming strands on separate halves so that a mutual rotation of the split halves can adjust the tension in the entire cable circuit. The transmission has a high speed, low tension stage spanning the distance between the actuator and the reducer and a low speed, high tension, stage spanning the distance between the reducer and the output pulley. Preferably the cable in the second, low speed stage has a larger cross-sectional area than the cable in the first stage so that the stress per unit cross-sectional area throughout the circuit is generally constant. The cable is pretensioned, up to a maximum of half the yield strength of the cable, to a level that avoids any cable segment going slack at peak applied torque and avoids backlash. In the second stage, the cable may be multiple strands of a smaller diameter cable. A U-shaped path may form on at least one pulley to provide a turnaround for the cable strands. The turnaround allows a slippage of the cable within the path during pretensioning to equalize the lengths and tensions of the multiple strands at full pretension automatically.

A cable meshing of two or more rotating cylinders having a smooth outer surface allows the construction of a highly compact differential cable transmission where the axes of rotation of the cylinders (flange-less pulleys) can intersect one another. The cylinders have a smooth outer surface parallel to the axis of rotation of that cylinder. Also, the cylinders are separated by a gap $G$, where $0 \leq G \leq R$ and where $R =$ the radius of the meshing cable. The cable undergoes an instantaneous change of direction at a transfer point where it jumps from one cylinder to the other. The cable is preferably terminated on the cylinders and pretensioned to avoid backlash. The cylinders are axially stepped and separate cables run on each step to provide bi-directional rotation. The transfer points of the cables lie on lines that pass through the point of intersection of the axes of rotation of the cylinders. To form a differential cable transmission, three pulleys are used, the output pulley having four axially stepped smooth outer cable carrying surfaces.

The cable transmission thus described lends itself to a highly compact geometry with a good aspect ratio for the link and frame, that is, long and narrow links. This design, particularly when used with a brushless D.C. motor and pulse width modulated controller, provide excellent force control for the links which is conducive to whole arm manipulations where the arms engage objects in their environment anywhere along their length. The links preferably have a friction sleeve covering that is compliant to promote a cushioned and reliable engagement with the objects.

These and other features and objects of the present invention will be more fully understood from the following detailed description, which should be read in light of the accompanying drawings.

BRIEF DESCRIPTION OF THE DRAWINGS

FIG. 3 is a side view in elevation, and partially in section, of the transmission shown in FIG. 2;

FIG. 4 is a top plan view of the transmission shown in FIGS. 2 and 3;

FIG. 9 is a detailed view in perspective of a cable-slip turnaround formed in an output pulley.

DETAILED DESCRIPTION OF THE PREFERRED EMBODIMENTS

Figure 1:
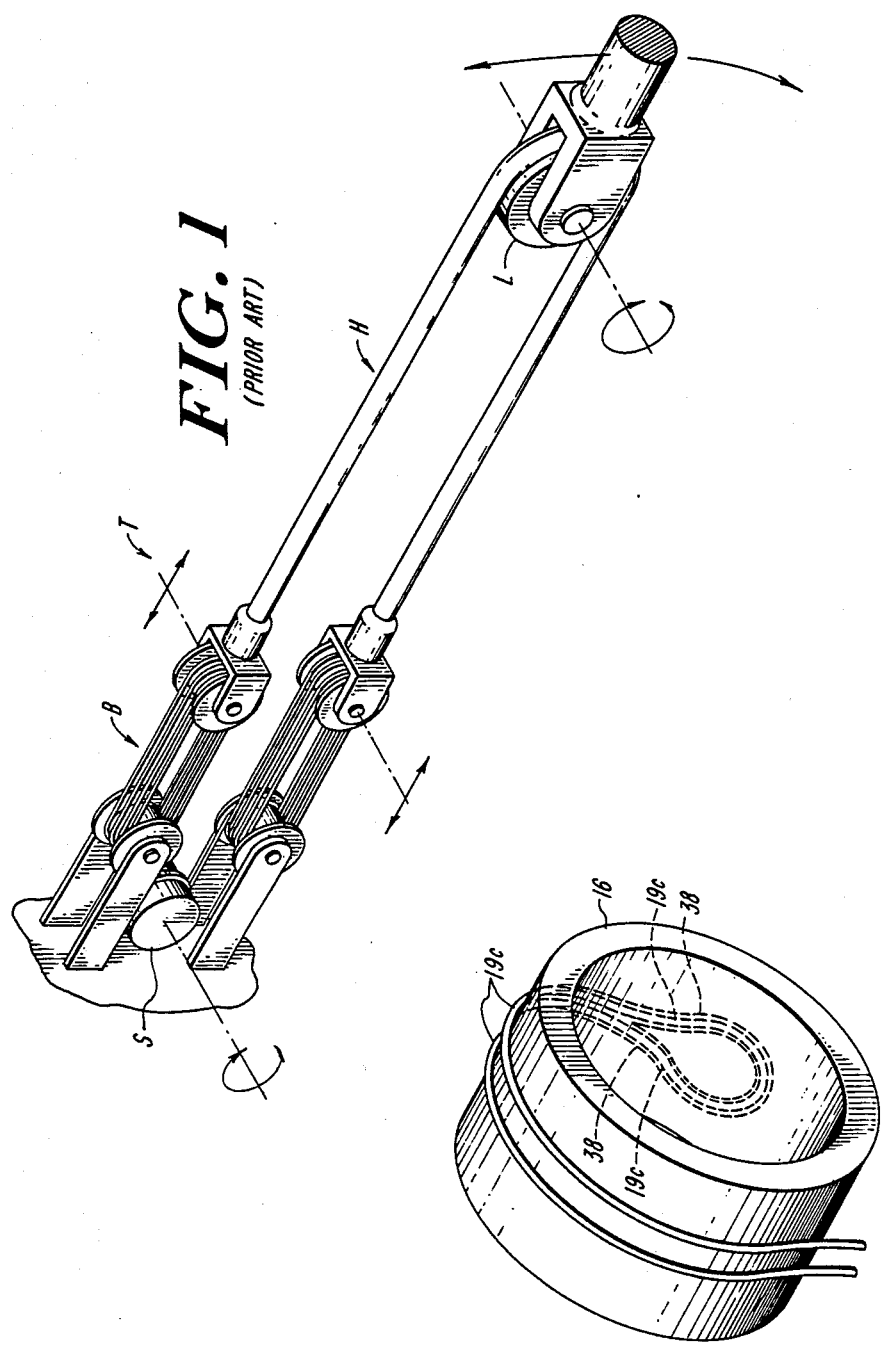
FIG. 1 is a simplified perspective view of a prior art block and tackle cable transmission for use in a teleoperator.

FIG. 1 shows a recent prior art attempt by Vertut and Coiffet, referenced hereinabove, to create a cable transmission for a teleoperator that they have designated as Model MA23M. A motor drives a shaft S that uses pretensioned cables to transmit the input torque to a load applied at the pulley L via a block and tackle transmission T. A low tension section spanning the blocks and tackles B is near the shaft S. A high tension section H is spanned by a single, heavy cable. The section H is comparatively long and must resist the substantial compressive forces produced by the large mechanical advantage of the block and tackle, which for the MA23M is forty two. This arrangement suffers from the disadvantages noted above in the Background of the Invention.

FIGS. 2-4 and 9 show in a simplified schematic form a highly stiff, compact, low friction and low torque ripple cable transmission 12 according to the present invention that transmits torque via a cable 19 over a distance L from a rotary actuator, such as an electric motor 14, to an output pulley 16 secured to one end of a link arm 18. A reducer 20 is located at a point that is distal from the motor 14 and close to the output pulley 16. The reducer is preferably mounted at a distance C from the motor at the far end of a support frame 22, which may also be a link arm like the arm 18. A coupling member 24 spanning the frame 22 and link arm 18, mounts the reducer 20 and the pulley 16, and defines the joint which allows the link arm 18 to articulate. As shown by the arrow 26, the link arm articulates bi-directionally, in response to corresponding rotation of the motor shaft 28, in a plane that is generally transverse both to the axis of rotation of the output pulley 16 and to the axis of rotation 28a of the output shaft 28 of the motor 14. According to the present invention, $C > (L-C)$, and preferably $C \approx L$.

In its preferred form, the reducer 20 consists of two sets of idler pulleys 20a,20b that are freely rotatable on a shaft 30, but are coupled to one another to rotate in unison. The pulley 20a has a larger diameter than the pulley 20b to provide, in part, the desired reduction. In the preferred form, the two pulley sets 20a,20b rotate independently of one another. As will be discussed below, this allows a pretensioning of the entire cable circuit from a single point.

The output pulley 16 is fixed on a shaft 16b that rotates freely in the coupler 24. While the output pulley could be a single pulley, or equivalent cable engaging surface, it is preferably formed as a pair of pulleys 16,16, each of which is aligned with an associated one of the pulleys 20b. The output pulleys 16,16 preferably have a diameter larger than that of the reducer pulleys 20b,20b to provide an additional mechanical advantage in transmitting torque from the motor 14 to the link 18.

All of the pulleys 20a, 20b and 16 can assume a variety of known styles or be formed from any of a wide range of structural materials. They preferably are formed of aluminum with a smooth outer surface that promotes low wear rates between the materials of the pulley and the cable. While it is not essential, the pulleys may include flanges to prevent the cable from disengaging from the pulley. However, this will usually not be required since the alignment of the pulleys and pretension in the cable will not permit any substantial lateral wandering of the cable as it winds and unwinds from the pulleys. Also, to reduce the mass and rotational inertia of the pulleys, they are preferably formed as thin hollow cylinders with a web of structural material supporting the cylindrical surface and a bearing surface that rides on, or is secured to, the shaft 30 or 16b.

The cable is highly stiff, strong, flexible, and has as small a diameter as possible given the stresses that will be encountered in operation. A steel cable formed of twisted strands has been found to work well. In one embodiment similar to FIGS. 2-4, applicants have used a 7×49, 0.044 in diameter, steel cable with a 170 pound minimum breaking strength. Its stiffness per unit length, EA (modulus of elasticity, E×cross-sectional area, A) has been found to be about 9,500 lbs. It is important that the cable be strong enough to resist fatigue at the force levels encountered in the transmission, including transient impulse torques that may exceed a steady state torque, yet, over the length of cable required, not introduce a significant level of elasticity due to the inherent resilience in the cable itself, even though the cable over short lengths may be substantially inextensible (stiffer). The precise diameter and characteristics will, of course, depend on the specific application including factors such as the applied torque, the output torque, and the bending radii required by the various pulleys necessary to produce the output torque while maintaining a construction that is compact.

Figure 2:
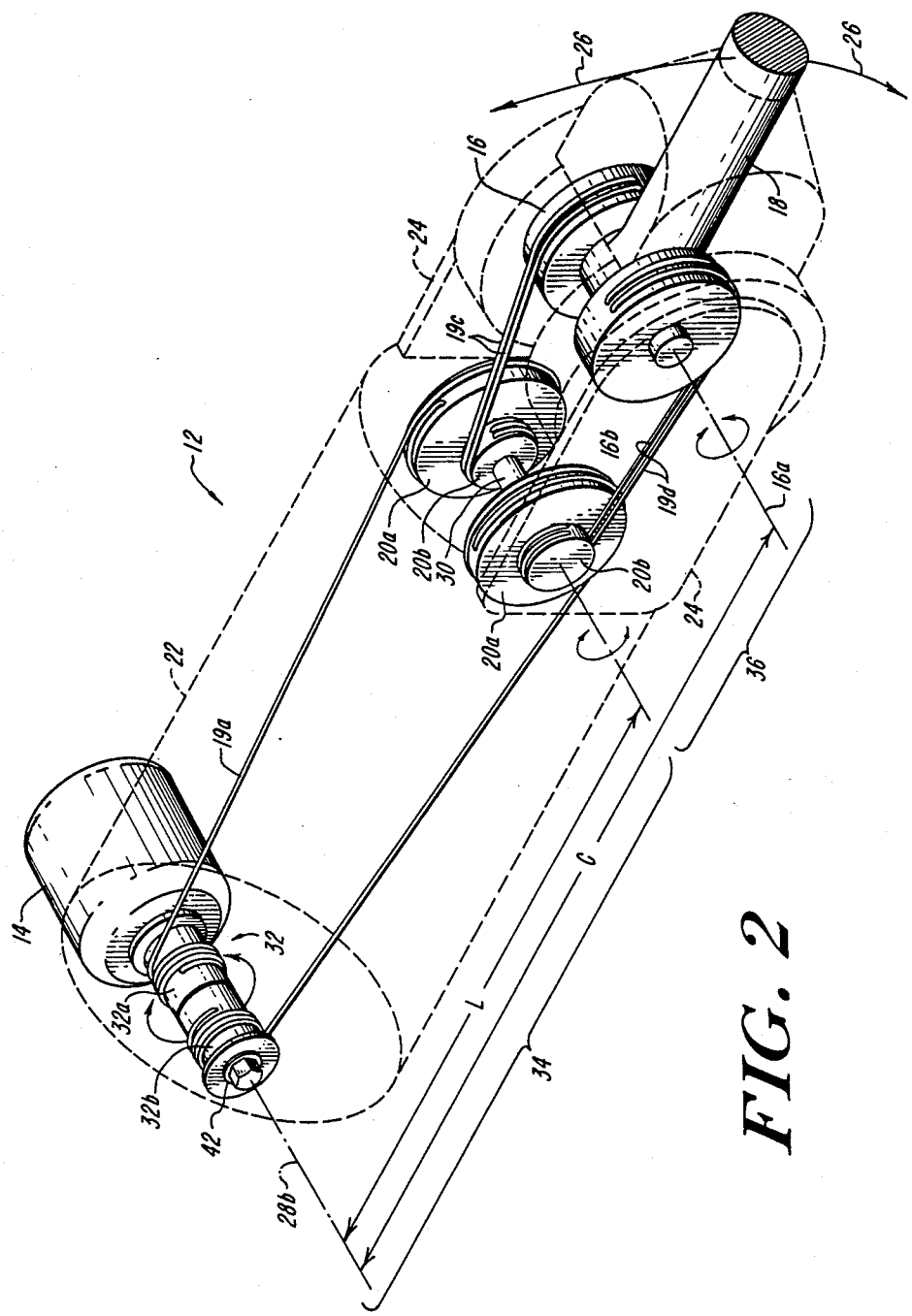
FIG 2 is a simplified view in perspective of a two stage cable transmission according to the present invention.

While it is possible to use a single length of cable to couple all of the transmission elements, in the preferred form the cable 19 is actually multiple lengths of cable that are secured a their ends to pulleys or other equivalent elements in the transmission. This has the advantage of reducing somewhat the total cable length, provides a positive anchoring of the cables at the terminations, and allows variations in the cable diameter to be introduced simply by selecting cable lengths for different portions of the transmission which have different diameters, or other characteristics. Thus, as shown in FIGS. 2 and 4, the cable 19 includes two lengths 19a and 19b each with one end secured on one of the pulleys 20a and the other end secured on a separate half 32a or 32b of an axially split spool 32 mounted on the output shaft 28 of the motor 14. Separate lengths of cable 19c and 19d are secured at one end on the pulleys 20b and at the other end on one of the putput pulleys 16,16.

Because of the reduction, the cable lengths 19a and 19b operate at a high speed under a low tension in comparison to the lengths 19c and 19d which travel at a much lower speed, but at a greatly increased tension. (The total reduction is typically by at least a factor of 10.) The cable lengths 19a and 19b therefore define a high speed, low tension stage 34 of the transmission which transmits the applied torque over a long distance (C). The cable lengths 19c and 19d define a low speed, high tension stage 36 of the transmission which transmits a high torque over a short distance $(L-C)$. Because the distance $L-C$ is short, the large compressive forces generated by this section need only be supported over a short distance by the coupler 24. Among other advantages, this reduces the mass of the transmission at the end near the load.

A design objective of this transmission 12 is to have the stress per unit cross-sectional area of the cable be as nearly uniform as possible throughout the circuit. Since the tensions on the cable in the high tension stage is greater than in the low tension stage 34, there must be a corresponding adjustment in the cable diameter. While one can simply use a larger diameter cable in section 36, this has the disadvantage that a thick cable exhibits greater energy loss and fatigue in wrapping around a small diameter pulley (e.g., pulley 20b) than a smaller diameter cable. To meet both design objectives, one feature of the present invention is to use a single or multiple strand length of comparatively small diameter cable that is doubled back to form the lengths 19c and 19d, as shown in FIG. 2. One difficulty in this approach, however, is that unless the strands are perfectly equal in length, and otherwise of very closely matched characteristics, one or some of the strands will bear a disproportionate share of the load, and may fatigue or break. To avoid this situation, an automatically self-adjusting turnaround in the form of a U-shaped path 38 is provided, as shown in FIG. 9. The two strands are thus formed from a single continuous length of small diameter cable that is doubled back on itself. In one form, the free ends of the strand (or strands in a four strand embodiment) are fixed on the same pulley (e.g. pulley 20b), and the turnaround occurs at the other pulley (e.g. pulley 16). A capstan, or some equivalent such as a U-shaped groove, as shown, can be machined or mounted on or near the outer surface of the pulley. It has been found that if the strands are of uneven length, as they are pretensioned they will slip along the U-shaped path to automatically adjust the lengths of the two strands so that they each carry approximately the same load.

Another significant aspect of the present invention is that the entire cable is pretensioned at a single point, the split spool 32, as opposed to pretensioning each stage separately as required in prior art systems. This is possible because the torque transmitted by one half of the cable circuit (lengths 19a and 19c, as shown, and the associated spools and pulleys) are opposed by the mirror image other half of the circuit (lengths 19b and 19d and the associated spool and pulleys). More specifically, the cable lengths 19a and 19b are wound in opposite directions on separate halves 32a,32b of the spool 32. By loosening the set nut 42, the two halves can be rotated with respect to one another about the shaft 28. If one half 32a is rotated to wrap, and therefore tension the cable 19a, this transmits a force tending to rotate the associated pulleys 20a and 20b. The cable 19c is thereby urged to wrap on the spool 20b, which in turn applies a torque to the associated pulley 16. Because the two output pulleys rotate in unison, and because the cable 19d is wrapped in an opposite sense to the cable 19c, the cables 19d and 19b, acting through the associated pulleys 20a,20b and spool 32b, act together to oppose the torque initially applied at spool half 32a. Conversely, a torque applied at spool half 32b tending to wrap cable 19b will be transmitted to the output pulley 16,16 and resisted, ultimately, by the spool half 32a. Thus, by loosening the unit 42, and counterrotating the spool halves 32a, 32b to wrap the cables 19a and 19b, the entire cable 19 can be pretensioned to any desired level. The pretension applied is preferably no more than half the yield strength of the cable 19, and typically less to avoid metal fatigue and the risk of breakage under maximum applied torque. The level of pretension should be sufficiently great that with the application of the maximum anticipated input torque no portion of the cable 19 will go slack and thereby reduce the stiffness of the transmission. The pretensioning should also be sufficient to avoid backlash.

The transmission 12, using pretensioned cables which exhibit low friction with the pulleys, take advantage of the high efficiencies of such systems. Ignoring parasitic losses such as bearing friction, efficiencies of approximately 96% have been calculated as worst case efficiencies under maximum load, and efficiencies of up to approximately 98% are feasible. The use of cable also has a significant advantage over prior gear train systems in that the low mass of the cable reduces the inertia of the system. The transmission 12 is highly stiff; it appears to have no significant spring element in series with the cable. The transmission 12 exhibits substantially no backlash and good "backdrivability". The transmission 12 also exhibits low torque ripple; the force applied by the system at the link arm 18 has good fidelity with the torque supplied as an input at the motor shaft 28. This characteristic, when combined with the stiffness, efficiency, low mass and absence of backlash provide a transmission that is well suited to operation under automatic control. All of these advantages are achieved using conventional components and materials that are easily machined and assembled.

Figure 5:
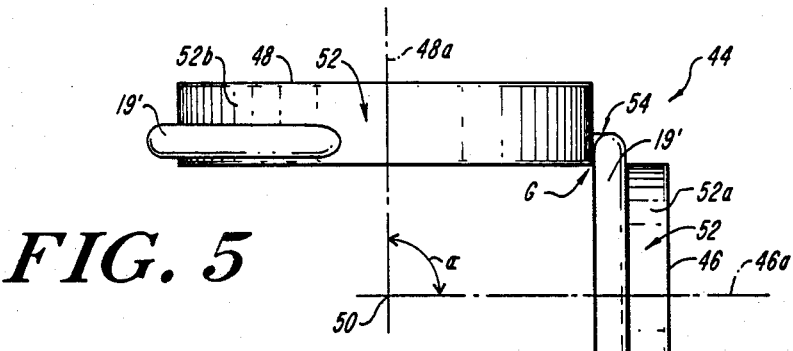
FIG. 5 is a simplified view in side elevation of a two pulley transmission with a cable intermesh according to the present invention.
Figure 6:
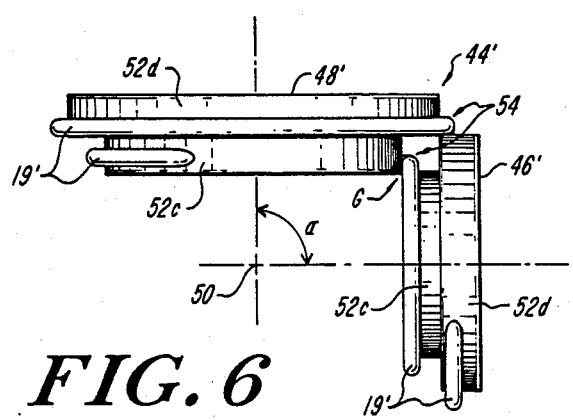
FIG. 6 is a view corresponding to FIG. 5 of a two pulley transmission with a cable intermesh that is bi-directional.
Figure 7:
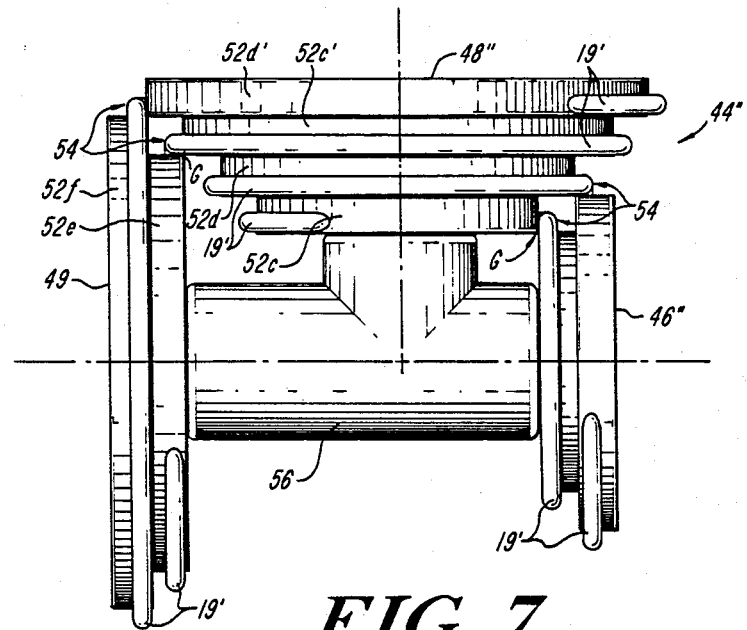
FIG. 7 is a view corresponding to FIGS. 4 and 5 of a bi directional four cable, three pulley differential transmission.

Another important feature of the present invention is a transmission 44, shown in various forms in FIGS. 5-7, using one or more cables to mesh smooth outer surface pulleys (or "cylinders") that have non-parallel axes of rotation. FIG. 5 shows the cable transmission in its simplest form, a uni-directional transmission 44 using pulleys 46 and 48 meshed by a cable 19' (like parts being identified with the same reference number, but with a prime or double prime to denote their use in different embodiments). Each pulley 46,48 rotates about an associated axis of revolution 46a and 48a, respectively. (It will be understood that for clarity of exposition, shafts, bearings, frames and other standard components for mounting rotatable pulleys, whether driven or idlers, are not shown.) In the preferred embodiment shown, the axes of revolution 46a and 48a intersect at a point 50 and at an angle $\alpha$ equal to 90°. Given normal machining tolerances, and other operating parameters delineated below, the axes may not precisely intersect in a mathematical sense, but they are designed to intersect to yield a transmission that is as compact as possible (and which is easily modeled to facilitate mathematical analysis of the transmission to optimize the design for a given application).

It is significant that the pulleys 46, 48 are not of conventional design, with flanges to guide or retain a cable or belt on the pulley, and they do not even have a groove or other indentation to guide the cable. In sharp contrast to any prior art attempts known to applicants to guide cable between non-aligned pulleys, the outer, cable carrying surfaces 52,52 are smooth, cylindrical, and generally parallel with the axis of rotation of the associated pulley (these combination of characteristics will be referred to hereinafter simply as a "smooth outer surface"). The pulleys and surfaces 52,52 can be formed of any of a wide variety of structural materials such as aluminum or steel. The cable 19', similarly, can be formed of a variety of strong, flexible materials such as twisted steel or plastics such as the products sold under the trade designations Kevlar or Spectra-1000. The cable 19' is under sufficient tension to provide at least a reliable coupling between the cable and the pulleys. Preferably the cable 19' is pretensioned to a degree that eliminates backlash and avoids any portion of the cable going slack.

The cable 19' wraps, as shown, on at least one portion 52a of the circumference of the surface 52 of the pulley 46, on another portion 52b of the circumference of the surface 52 of the pulley 48, and bridges the two pulleys at a transfer "point" 54. When carried on the surfaces 52a,52b the cable 19' travels in planes that are perpendicular to the axes of rotation 46a, 48a. The tension in the cable 19' produces a component of force that is directed radially inward toward each axis of rotation. With the intersecting axes of rotation and the smooth outer surfaces 52,52 oriented as described, it has been found that the cable 19' will undergo a substantially instantaneous change of direction at the transfer point 54, from one plane of rotation on the pulley 46 to another plane of rotation on the pulley 48, without falling off of the outer surface of either pulley, and without binding in the V-shaped intersection of the outer surfaces 52a and 52b at the transfer point. Stated in other terms, the radial component of force holding the cable 19' on the pulleys 46 and 48 undergoes a substantially instantaneous change of direction at the transfer point such that there is a negligible component of force tending to draw the cable 19' laterally toward the point 50 (negligible being defined functionally in that any minor lateral forces are not sufficient to displace the cable from its preferred pathway). It has been found that a groove or flange on the surfaces 52,52, while heretofore thought to be a necessary or desirable guide for the cable, will in fact impede the "instantaneous jump" of the cable 19' from one pulley to the other.

The outer surfaces 52a,52b at the transfer point 54 are either at a zero clearance, or spaced closely by a gap G where $0 \leq G \leq R$, where R is the radius of the cable 19'. This degree of spacing has been found to facilitate the transition of the cable between the pulleys without either (1) introducing a sufficient lateral force on the cable that would interfere with the aforementioned operation of the cable at the transfer point or (2) provide a large enough gap such that if the cable should migrate laterally across the surface 52a or 52b to the gap it will wedge in the gap or bind. The cable can be endless or of finite length with its ends fixed on the pulleys 46,48, as shown, depending on the application. Also, while only a partial wrap of the cable around each pulley is shown, the wrap can be longer to provide a greater range of angular motion.

In the preferred form the cable of the present invention operates with the pulleys 46,48 rotating at right angles to one another ($\alpha=90°$), as shown. However, some deviations from a precisely perpendicular relationship can be tolerated, with the degree of permissible angular deviation to be determined empirically for each application. It is believed that factors influencing the permissible deviation from a 90° angle of intersection include the requirements of the application, the diameter of the pulleys, the level of the tension in the cable, the length of the cable in contact with the pulleys, the flexibility of the cable, and the coefficient of friction between the cable and the pulley outer surfaces.

FIG. 6 shows a bi-directional transmission 44' using pulleys 46' and 48' that are axially stepped to produce two smooth cable-carrying surfaces 52c and 52d on each pulley that are both smooth outer surfaces (cylindrical and generally parallel to the axis of rotation of the associated pulley 46' or 48'). The pulleys are positioned so that the surfaces 52c and 52d of each pulley are closely spaced by the gap G from the corresponding smooth outer surface on the other paired pulley of the transmission. The angle $\alpha$ is most conveniently 90° to achieve this relationship and to have the axes of rotation of the pulleys intersect at 50, however, with compensating adjustments in the dimensions of the pulleys outer surfaces and radii, the angle $\alpha$ may be vary slightly from 90°. Each surface 52c,52d carries a separate cable 19'. By wrapping the cables on the surfaces in opposite directions, as shown, the differential 44' becomes bi-directional in that there is a positive drive as one of the two lengths of cable 19' wraps on one of the smooth outer surfaces if either pulley 46 and 48 is driven to rotate in either direction. It should be noted that the centers of the cables at the transfer points 54 lie along a line that passes through the point of intersection 50. If the cables are properly tensioned, this bi-directional drive will be substantially free of backlash, an operating characteristic which is difficult to achieve using standard meshed bevel gears, and if attainable, requires a significant trade-off with efficiency and/or cost of manufacture.

FIG. 7 shows a three-pulley, four-cable differential transmission 44" with a spider 56 that employs features and mode of operation described above with respect to the paired pulley transmissions of FIGS. 5 and 6. A third input pulley 49 is mounted opposite a pulley 46". As shown, the axis of rotation of the pulleys 46" and 49 are coincident. The pulley 46" has a construction identical to that of pulley 46'. The pulley 49 has the same construction, but it has different radii for its cable-carrying surfaces 52e and 52f than those for the surfaces 52c and 52d of pulley 46". The output pulley 48" has four axially stepped, smooth, cylindrical, cable-carrying outer surfaces 52c, 52d, 52c', 52d', two of which mesh with the smooth outer surfaces of the pulley 46" via two cables 19' and two of which mesh with the surfaces 52e,52f via two other cables 19'. The cables 19', as in the FIG. 6 transmission, are wound on each pulley in opposite senses to provide bi-directional control between adjacent pairs of pulleys. Again, the centers of the cables at the transfer points 54 lie along lines that pass through the point of intersection 50.

In the preferred form shown, the cables 19' are each terminated on the pulleys and have a sufficient length to allow a complete rotation of the output pulley 48" in response to input torques applied in differential fashion to the pulleys 46" and 49. Output torques are the rotation of the output pulley 48" about its axis of rotation (a motion in robotics simulating the twisting of a wrist) and the rotation of the spider 56 and the pulley 48" about the axis of rotation of the pulleys 46" and 49 (in the manner of a conventional spider on an automobile differential). With the cable transmission of the present invention, where the output torques $T_1$ and $T_2$ can each be represented as a linear combination of the input torques $t_1$ and $t_2$ in the form, $$T_1 = at_1 + bt_2$$

$$T_2 = ct_1 + dt_2$$

where a, b, c and d are constants, the output torques are in mathematical terms a linear recombination of the input torques.

In the FIG. 6 and 7 transmissions the pairs of cables 19' coupling adjacent pulleys can be pretensioned conveniently by forming at least one pulley of each pair with the axially stepped portions split from on another and rotatable independently when set screws or other conventional mechanisms (not shown) for releasably securing their mutual angular orientation are loosened. By adjusting the mutual angular orientation of the split pulley portions it is possible to adjust the amount of the cables wrapped on the smooth outer surfaces and thereby to adjust their pretension.

Figure 8:
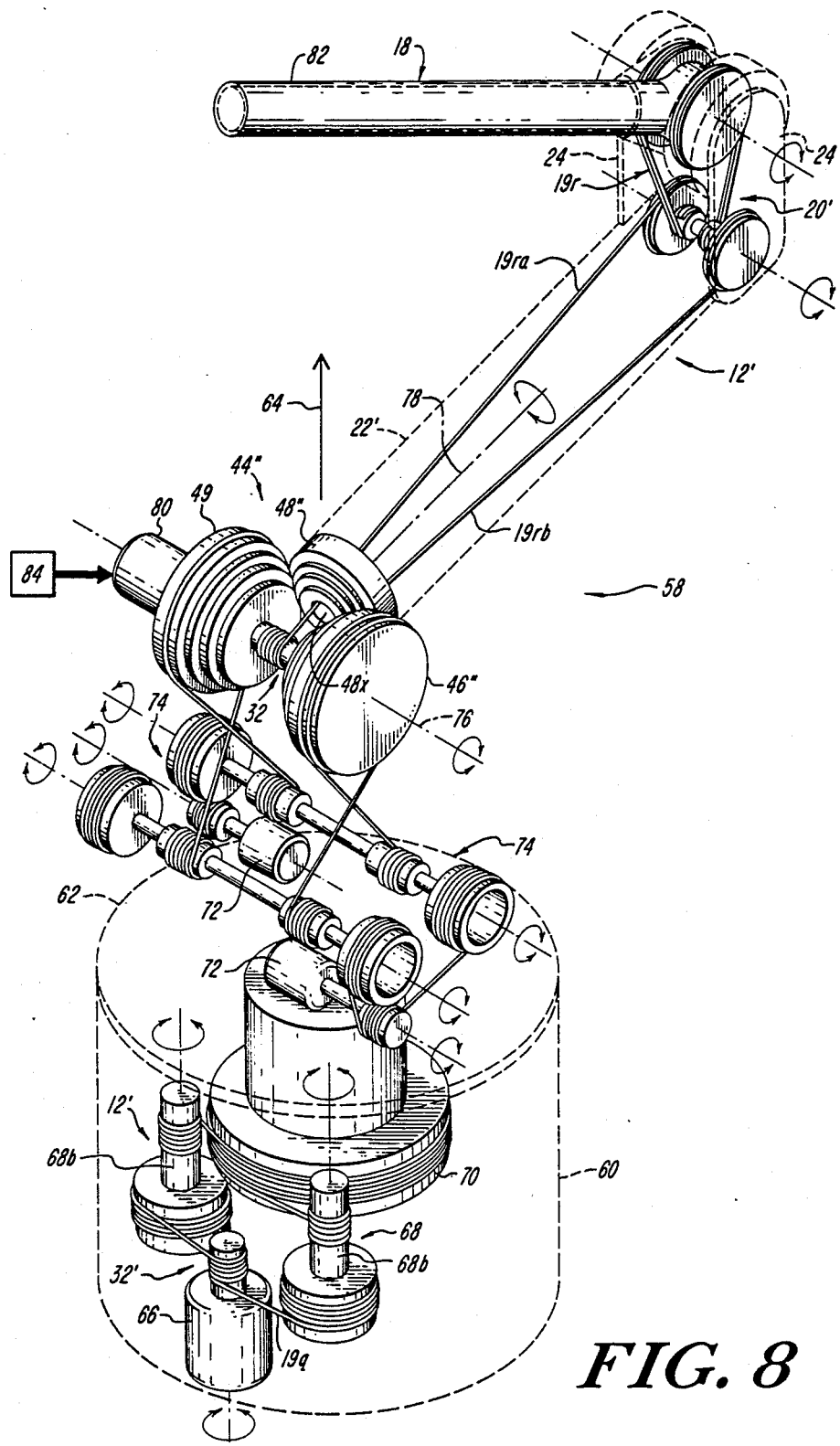
FIG. 8 is a simplified view in perspective of a four degree of freedom robot arm utilizing the transmissions and principles shown in FIGS. 2-7.

FIG. 8 illustrates a four-degree-of-freedom robotic manipulation arm 58 utilizing the transmissions and principles described above with respect to FIGS. 2-7. The arm 58 utilizes the cable differential transmission 44" to produce a twisting, wrist-like action. A two stage (a high speed, low tension stage and a low speed, high tension stage) cable transmission with distal reduction controls the articulation of a remote link arm 18 mounted at the end of a frame 22, which is in turn supported on the pulley 48" of the differential.

The arm 58 also illustrates another significant feature of the present invention, "whole arm manipulation", that is, the robotic manipulation of objects not by gripping them in a hand-like element, but rather by engaging them with the side of the link arm itself. With reference to the arm 58, whole arm manipulation can be accomplished with the arm 18 alone, the arm 18 acting in cooperation with the frame 22, these elements acting in cooperation with additional links, not shown, coupled to the end of the link 18 as it was coupled to the frame 22, or one or more of these links acting in coordination with like links of a second or multiple other arms 58.

The arm 58 has a base 60 which supports a platform 62 rotatable about a vertical axis 64 (the first degree of freedom) under control of motor 66 and a cable transmission 12' of the type described above with reference to FIGS. 2-4, but having neglible link lengths. A split spool 32' mounted on the motor output shafts acts through a reducer 68 via a cable 19q. The pulleys 68b of the reducer are coupled to a larger diameter output pulley 70 that drives the platform 62. A pair of side plates (not shown) mounted on the platform support mirror-image sets of electric motors 72,72 and associated reducers 74,74 which drive pulleys 46" and 49 of the differential transmission 44". The pulleys rotate about the axis 76. If the motors 72,72 drive the pulleys 46",49 in the same direction and through the same angular motion, then the entire differential gear, together with the frame 22 and link 18, rotate in a vertical plane perpendicular to the axis 76 (the second degree of freedom). If the motors 72,72 rotate in opposite directions, they produce a rotation of the pulley 48" about axis 78 in either direction, depending principally on the relative rates of rotation of the pulleys 46" and 49 (the third degree of freedom). Another motor 80, mounted on the frame structure of the platform 62, corresponds to the motor 14 in FIGS. 2-4. It drives an axially split spool 32 which wraps both ends of a cable 19r, but in opposite senses. The spool is located between the pulleys 46" and 49 of the differential 44" and the high speed cable portions 19ra and 19rb pass through an opening 48x and within a first link arm 22' corresponding to the frame 22 of FIGS. 2-4. The link arm 22 (in the preferred form a hollow, thin-walled member with a generally circular cross-section) is mounted on the pulley 48", or operatively coupled to it, to rotate about the axis 78 under the control of motors 72,72 acting through the reducers 74,74. The cable 19 is coupled to a reducer 20' that articulates a link arm 18, all in the manner described above with respect to FIGS. 2-4 (the fourth degree of freedom).

A significant aspect of the cable transmission of the present invention is that they allow the construction of a manipulator such as the arm 58 where the link arms have a high aspect ratio, that is, they are long and slender, and the design is otherwise "clean", that is there are no components that project laterally from the link arms to any significant degree. In particular, actuators, couplings and reducers are either removed from the links, or they are compact so that their lateral profile is consonant with that of the link itself.

The arm 58 can utilize the whole arm concept in part because the cable transmission of the present invention has characteristics such as a low mass, high stiffness, zero-backlash, low ripple torque transmission, high efficiency, and the geometric flexibility of cables. These characteristics lend themselves to a practical system of force control to control the movements of the link arm 58, as opposed to prior art position control systems.

With a high fidelity force control, interaction between the arm and its environment can be used to guide a robot to its objective and to clutch an object, much as a person can carry an object by compressing it between his arm and his body. "Whole arm" gripping can therefore use one arm interacting with the object-to-be-gripped and a third object, two arms that grip the object scissor-fashion, three arms that surround the object, two opposed arms of two links each that grip an intermediate object, or any of a variety of other modes that will readily occur to those skilled in the art.

In each instance, a good aspect ratio is important. It enhances the ability of the arm to reach around objects, it minimizes the manipulator s interference within the available work space, it maximizes the length of the link available for contact with an object, and it maximizes the size of objects that may be gripped by the arm. To enhance the gripping ability of the arm operating on the whole arm principal, the outer surface of the link is preferably covered with a sleeve 82 of a compliant high friction material. The compliance absorbs impact energy and provide a controller 84 time to react to changing dynamics. The friction should be Coulombic because stiction between the sleeve and the environment compliances causes stick-slip.

While force control has been used for end-point wrist control for closed loop contact force control, the dynamics between the actuator and force sensor have led to instabilities and bandwidth limitations. Force control suitable for a practical whole arm application has heretofore been hardware limited. Therefore in addition to the cable transmission of the present invention, it has been found to be helpful to use a brushless (electromically commutated, permanent magnet) D.C. motor combined with a pulse-width-modulated (PWM) controller such as the Model 303-038 motor and Model 152P227 controller manufactured by Moog, Inc. In one example of the operation of whole arm manipulation, as a link arm moves toward an object the motor(s) will develop a generally steady torque to produce the motion. When the arm encounters an object in its environment, it will draw increasing amounts of current to produce an increased output torque. At a preset level, the controller interprets the increased electrical power required to produce the increased torque as the arm encountering a fixed object. The controller can then use this information to guide further movements, or to maintain the output torque at a level sufficient to provide a desired level of gripping force. It should be noted that this method of force control assumes that the motor has excellent torque control and therefore the motor torque is a direct function of the torque at the output joint. And as a result, good current control to the motor produces accurate output torque control. With the actuator, controller and cabled transmissions described, these assumptions are justified.

There has been described a compact cable transmission that is stiff, exhibits no backlash, and exhibits excellent force transmission fidelity—low torque ripple. The transmission described herein is also characterized by a high efficiency and can be pretensioned at a single point. The mass of the system is low and the largest compressive forces need only be supported over a comparatively short length. The transmission is adaptable to servo control and can produce a level of force control that makes whole arm manipulation practical for a teleoperator. The cable transmission also provides a cable meshing of smooth rotating cylinders, allowing the construction of a highly compact cable differential transmission. Moreover, all of these advantages are available using conventional materials, standard construction techniques, and at a favorable cost of manufacture.

While the invention has been described with respect to its preferred embodiments, it will be understood that various modifications and alterations will occur to those skilled in the art from the foregoing detailed description and the accompanying drawings. Such modifications and alterations are intended to fall within the scope of the appended claims.

What is claimed is:

1. A compact cable transmission comprising
   first and second pulleys that are mounted to rotate about transverse axes and said pulleys each having a generally smooth outer surface that is oriented parallel to the axis of rotation of the associated pulley, and a cable
   that is carried on the outer surfaces of both pulleys to operatively couple them to transmit a torque between said first and second pulleys, said cable travelling in a first plane when carried on said first pulley and a second plane distinct from said first plane when carried on said second pulley,
   said first and second pulleys having their outer surfaces spaced from one another by a gap G, where $0 \leq G \leq R$ and where R is the radius of said cable, at a transfer point where said cable transfers from being carried on said first pulley with a component of force transmitted by the cable is directed radially inward toward the axis of rotation of said first pulley to being carried on said second pulley with a component of the force transmitted by the cable is directed radially inward toward the axis of rotation of said second pulley,
   said cable undergoing a substantially instantaneous change in direction of travel at said transfer point.

2. The transmission of claim 1 wherein said axes of rotation intersect one another.

3. The transmission of claim 2 wherein the outer surfaces of said first and second pulleys are axially stepped to form at least two cables carrying smooth outer surfaces on each pulley,
   said cable comprises separate lengths of cable wherein each cable length is carried on one of said outer surfaces of each pulley, and
   said pulleys are dimensioned and positioned with respect to one another that each outer surface of said first pulley is separated from a corresponding outer surface of said first pulley is separated from a corresponding outer surface on said second pulley separated from one another at said cable transfer point by said gap G.

4. The transmission of claim 3 wherein said separate cable lengths are wrapped on said stepped outer surfaces in opposite direction to provide a bi-directional transmission with a cable mesh.

5. The transmission of claim 4 wherein said stepped pulley portions of at least one of said first and second pulleys are split to permit their independent rotation to provide an adjustable pretensioning of said separate cable lengths.

6. The transmission of claim 4 further comprising a third pulley rotating opposite said first pulley, said first and third pulleys each having two stepped outer cable-carrying surfaces, and said second pulley having four stepped, cable-carrying surfaces each of which is operatively coupled to one of said stepped outer surfaces of said first and third pulleys by a separate length of said cable.

7. The differential transmission of claim 6 wherein said first and third pulleys are driven in opposite directions to produce a resultant rotation of said second pulley.

* * * * *